Feb. 14, 1933. M. C. TAYLOR 1,897,511
SEALING TOOL
Filed June 25, 1928 3 Sheets-Sheet 1
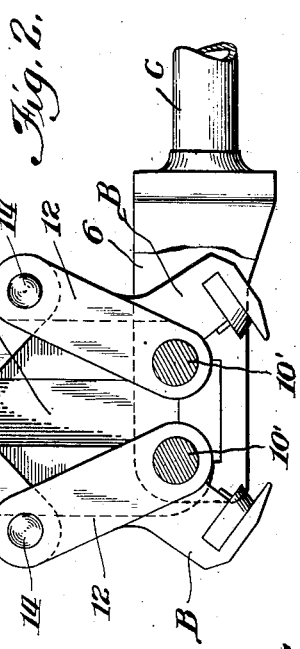
Fig. 2.
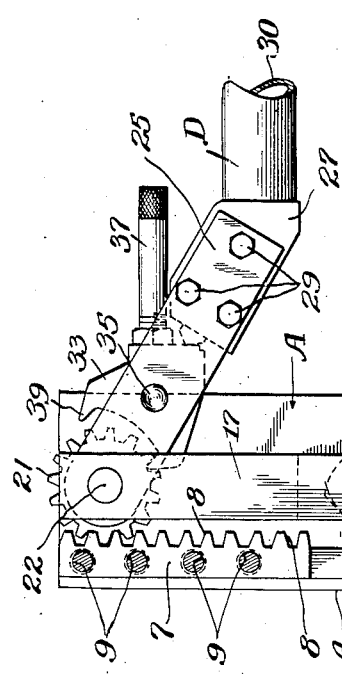
Fig. 1.
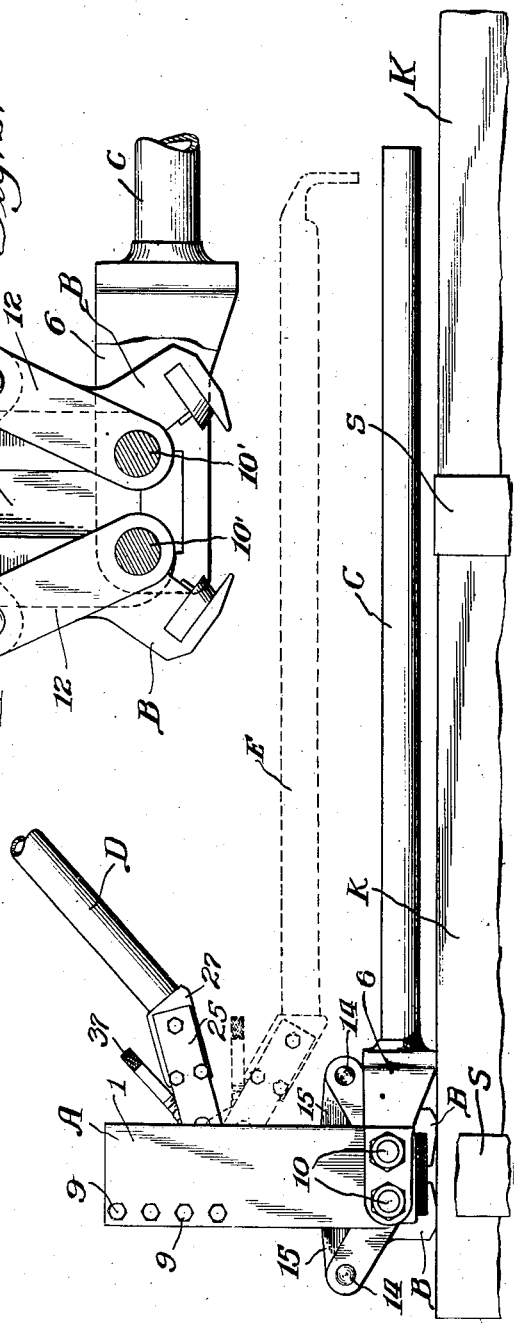
Inventor
Milton C. Taylor
By Williams, Bradbury, McCaleb & Hinkle
Attys.

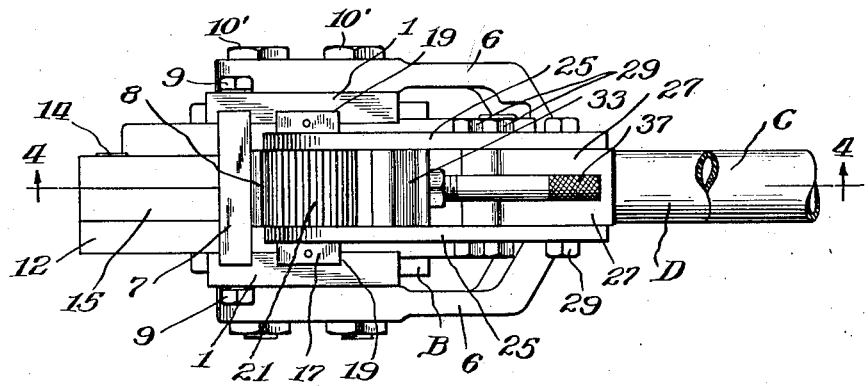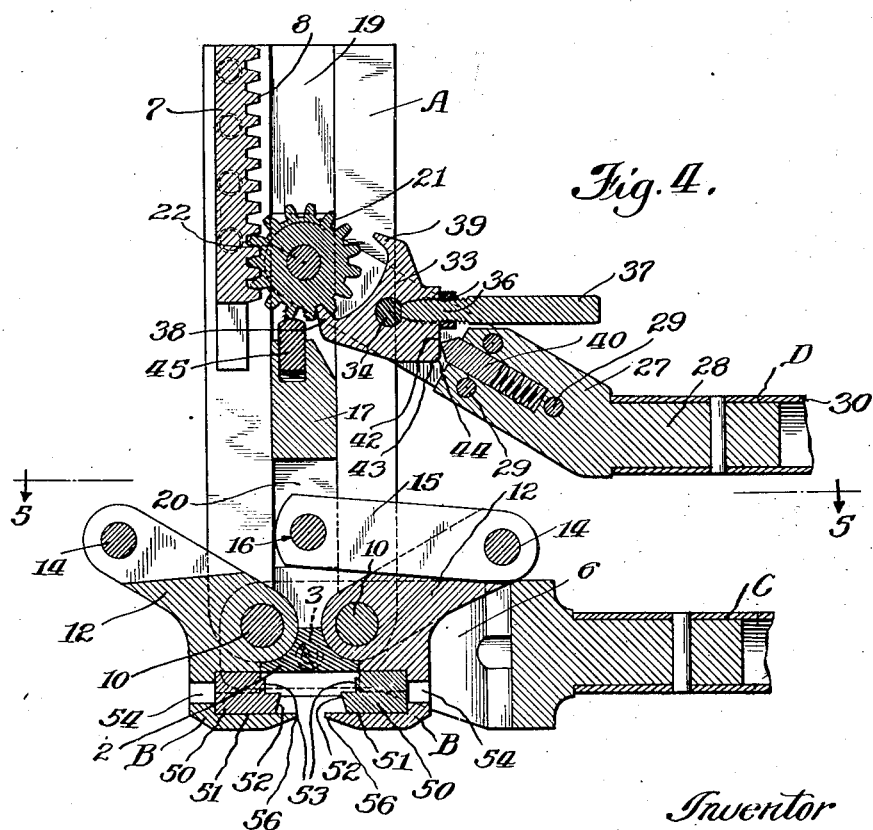

Feb. 14, 1933. M. C. TAYLOR 1,897,511
SEALING TOOL
Filed June 25, 1928 3 Sheets-Sheet 3
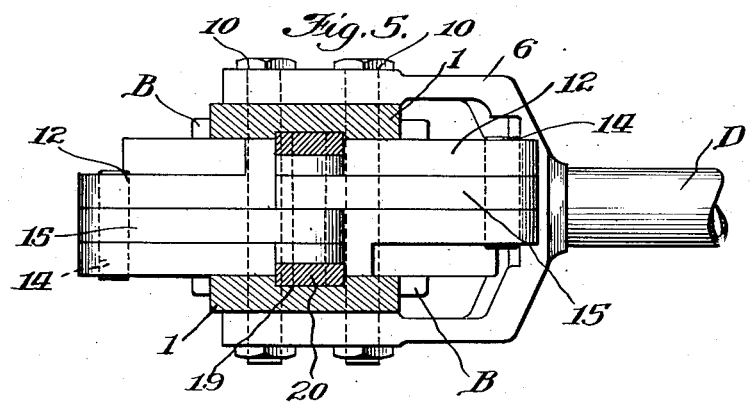
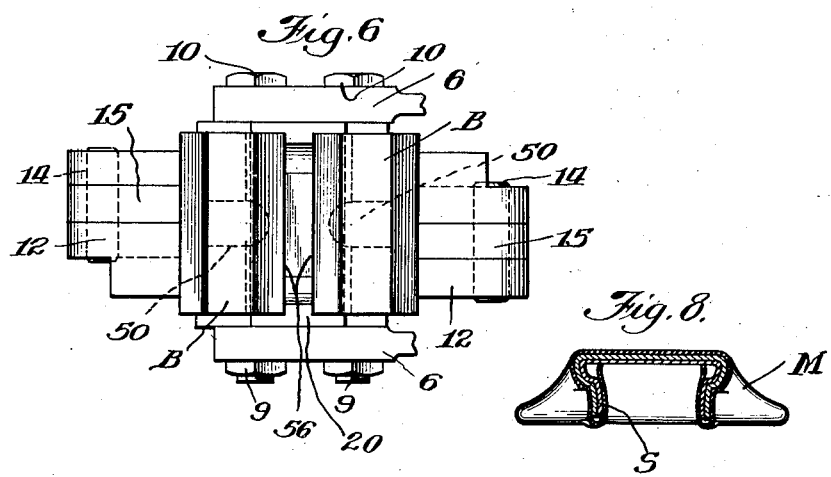
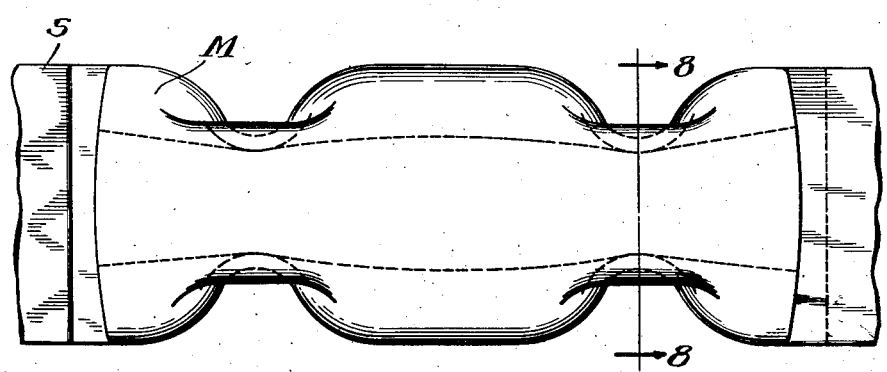
Inventor
Milton C. Taylor Patented Feb. 14, 1933

1,897,511

UNITED STATES PATENT OFFICE

MILTON C. TAYLOR, OF CHICAGO, ILLINOIS, ASSIGNOR, BY MESNE ASSIGNMENTS, TO SIGNODE STEEL STRAPPING COMPANY, A CORPORATION OF DELAWARE

SEALING TOOL

Application filed June 25, 1928. Serial No. 287,933.

My invention relates to sealing tools.

It is particularly applicable for use in forming a seal-joint to interlock the overlapped ends of steel band-strapping used for binding together large, heavy objects, such as lumber, steel plates, rails, metal frames, and the like; for example, a seal-joint of the general type set forth in E. E. Flora Patent No. 1,252,680 of January 8, 1918 or J. W. Leslie Patent No. 1,445,330 of February 13, 1923.

Heretofore the size of such seal-joints, produced by hand actuated sealing tools, has been limited to relatively small sizes of banding—banding exceeding 3/4 inch in width being unusual—because the tools were unable sufficiently to multiply the power applied to effect the necessary deformation of the overlapping band ends and encircling sleeve. This condition has obtained for years, although there has been a constant and increased field of use and demand for stronger and heavier banding.

One of the objects of my invention is to provide an improved sealing tool.

Another object is to provide a hand actuated sealing tool capable of producing larger and stronger joints than is feasible with tools heretofore used.

Another object is to provide a tool wherein the jaws that deform the band may be progressively brought together by a series of reciprocating movements of the actuating lever, thereby permitting the deformation to be completed in steps rather than in one single step as heretofore.

Another object is to provide a tool wherein the deforming jaws may be quickly brought to and retracted from the work.

Another object is to provide a sealing tool which is simple in construction, reliable in operation, effective on a relatively wide and heavy band, and which may be operated with relatively little manual effort.

Other objects and advantages will hereinafter appear.

An embodiment of the invention is illustrated in the accompanying drawings, in which:

Fig. 1 is a side elevation of the sealing tool;

Fig. 2 is an enlarged fragmentary side elevation of the tool with a side plate removed to expose the operating mechanism for the jaws;

Fig. 3 is a fragmentary top plan of the tool;

Fig. 4 is a sectional view along the line 4—4 of Fig. 3;

Fig. 5 is a sectional view along the line 5—5 of Fig. 4;

Fig. 6 is a fragmentary bottom plan view of the tool;

Fig. 7 is a top plan view of a seal-joint produced by the tool; and

Fig. 8 is a sectional view along the line 8—8 of Fig. 7.

In general, the sealing tool selected for illustration comprises a head A carrying a pair of opposed band-deforming jaws B and a pair of handles C and D. Handle C serves primarily to place and hold the tool to the work while handle D is operable to bring the jaws together for the deformation of the band in the production of a joint.

Head A comprises a pair of parallel steel side plates 1 interconnected and spaced apart at their lower ends by a rigid bridge piece 2, which is anchored to and between the plates by set screws 3. A yoke 6 straddles the spaced side plates serving to attach handle C thereto, as will be hereinafter explained. The outer ends of side plates 1 are interconnected and rigidly held in spaced relation by a rack 7 having inwardly facing teeth 8. Rack 7 is secured to and between the side plates by bolts 9 which pass through the plates and into threaded holes in the opposite sides of the rack.

Jaws B are pivotally mounted upon a pair of spaced apart parallel mounting pins 10, which may be in the form of bolts, extending through the legs of yoke 6, plates 1 and jaws B. These bolts therefore also rigidly attach handle C to the side plates and head of the tool. Bifurcated arms 12 are formed integral with jaws B above their fulcrums or mounting pins 10. These arms form part of a jaw-operating toggle mechanism and are pivotally connected by pins 14 to links 15, each link having one end lying between the bifurcated portions of the arms 12 and the opposite end pivotally connected by a pin 16 to a slide in the form of a block 17. Block 17 is mounted for reciprocation in opposed grooves 19 formed in the inner faces of plates 1. The ends of links 15 are received within a slotted portion 20 of block 17, as is best shown in Figure 4. The jaw actuating toggle will operate to close jaws B upon downward movement of block 17, and to open jaws B upon upward movement of the block.

The toggle operating mechanism includes a pinion 21 mounted upon sliding block 17 and having its teeth in mesh with the teeth 8 of rack 7, so that rotation of the pinion is translated into rectilinear movement of the block. Actuating handle D is pivotally mounted at its inner end upon the shaft 22 of pinion 21 by means of straps 25, one on each side of the pinion. A handle bracket 27, having a cylindrical extension 28, is rigidly secured between straps 25 by means of bolts 29. Handle D, consisting of a long steel tube 30, is fitted over cylindrical extension 28 of handle bracket 27 and locked thereto by suitable means such as a pin or bolt.

A pawl 33 is pivotally mounted upon and between straps 25 by shaft 34, which shaft extends through the pawl and has its opposite ends received in bearings 35 in the straps. Shaft 34 is secured to pawl 33 by a set screw 36, having an elongated knurled head 37 which, in addition to locking the pawl on its shaft, serves as a trigger to facilitate shifting the pawl into any one of its three operative positions. Pawl 33 has two teeth 38 and 39 selectively engageable with the teeth of pinion 21. A spring pressed plunger 40 carried in bracket 27 bears against the rear cam surface of pawl 33 yieldably to hold tooth 38 or 39 in engagement with the teeth of the pinion depending upon which of the cam surfaces 42 and 43 is engaged thereby. A notch 44 is formed between the surfaces 42 and 43 with which plunger 40 may engage to hold both teeth 38 and 39 clear of the pinion.

A spring pressed dog 45 is carried by block 17 and bears against the teeth of pinion 21. Dog 45 is movable along an axis perpendicular to and slightly to one side of the axis of the pinion (to the left as viewed in Figure 4). This dog serves to hold pinion 21 against counter clockwise movement (Fig. 4) and thus retains the block from moving backward and permitting the jaws to be separated by the resilient force exerted by the band being deformed. The dog, however, readily yields to such movement of the pinion under the force of an upward pull upon block 17, as by pulling handle D upwardly while it is in a vertical position.

Thus with tooth 38 engaging the teeth of pinion 21 movement of actuating handle D toward handle C rotates the pinion to advance block 17 and thereby close the jaws. When operating handle D is moved in the reverse direction, however, tooth 38 rides idly over the teeth of pinion 21, reverse movement of the pinion and sliding block 17 and opening of the jaws being prevented by dog 45. On the other hand, if tooth 39 engages pinion 21 movement of handle D away from handle C rotates pinion 21 in a counter clockwise direction, resulting in a rearward movement of block 17 and the opening of the jaws. With pawl 33 set in its mid position where neither of its teeth engage pinion 21 the reciprocation of actuating handle D has no effect although the sliding block may be readily pulled to its outer position to open the jaws or may be as readily pushed inwardly to bring the jaws upon the work ready for the deforming operation to begin.

For the purpose of producing a seal-joint of the character set forth in the Flora or Leslie patents previously mentioned, the deforming faces of jaws B each have cylindrical deforming pins 50 partially received within bores 51 formed in the opposite faces of the jaws and axially aligned when the jaws are closed. Each of the pins has a curved, forwardly extending, deforming surface 52 below the axis of the pin (Fig. 4). These surfaces incline inwardly toward their lower edges. The upper halves of the pins are contiguous with the adjacent faces of the jaws, except for slight offset portions 53 extending upwardly for a short distance from the curved portions 52. Passages 54, axially aligned with bores 51 through the outer walls of the jaws, are provided to facilitate removal of the pins by introduction of a punch or similar tool therethrough. Such removal may be necessary if the forming pins are broken or become excessively worn. Jaws B are further formed with lips 56 which overhang the curved portions 52 of the deforming pins.

In use the sealing tool is placed over an object K to be bound, as shown in Figure 1. Actuating handle D is then moved to a vertical position and pulled directly upward to move block 17 upwardly to the position shown in Figure 2, opening the jaws to their full extent. At this time pawl 33 should be in a position to engage pinion 21 with tooth 39, leaving tooth 38 free of the pinion, or with both teeth out of engagement with the pinion as by registration of plunger 40 with notch 44 of the pawl. As previously explained the positioning of pawl 33 is effected by manipulating trigger 37. If there is no considerable clearance between the jaws and the band to be deformed the jaws can be quickly brought into engagement therewith by pushing on handle D to slide block 17 toward the work, as previously explained. Then the operator holding handle C with one hand, oscillates actuating handle D back and forth with the other from the full line position to the dotted line position at E in Fig. 1, causing a progressive rotational movement of pinion 21 along rack 7 to drive slide 17 forward. As the slide moves forward the toggle mechanism will close and force jaws B toward one another so as to exert great edgewise pressure upon the overlapped band ends and sleeve M. Dog 45, during this operation, serves to prevent the resiliency of the bands from reversing the movement of pinion 21 upon the upward or inoperative stroke of handle D. Thus the jaws are made to maintain the position to which they are advanced or closed by each successive stroke of the operating handle and the deformation goes on progressively until completed.

As the jaws close, the overhanging lips 56 thereof will first underlie the overlapped band ends and sleeve, holding these parts against movement and further closing movement of the jaws while the parts are thus confined will deform the band ends and sleeve by engagement of the forming pins 50 with the opposite edges thereof.

When the jaws have been completely closed, the seal thus formed has the appearance shown in either half of Figure 7 and the sectional contour illustrated in Figure 8.

To open the jaws the operator disengages pawl 33 from pinion 21 by movement of trigger 37 and swings handle D to a substantially vertical position and there applies a straight upward pull thereto, causing pinion 21 to ride upon rack 7 free of pawl 33 so that the toggle mechanism will open to move jaws B apart and out of engagement with the interlocked or sealed band ends. The tool is then in readiness for use again.

When not in use, actuating handle D is permitted to lie parallel with handle C as shown in dotted lines at E in Figure 1, so that it may stand on its head in a comparatively small space with the handles extending vertically upward.

Having thus illustrated and described the nature and one embodiment of my invention, what I claim and desire to secure by United States Letters Patent is as follows:

1. A sealing tool for producing a seal-joint between the overlapped ends of a strapping band, comprising a pair of movable jaws for deforming the overlapped strap ends, and power multiplying means including an actuating handle for closing and opening the jaws, said handle being operable by oscillatory movement to close the jaws and by rectilinear movement to open the jaws.

2. A sealing tool for producing a seal-joint between the overlapped ends of a strapping band, comprising a pair of movable jaws for deforming the overlapped strap ends, toggle mechanism for moving the jaws toward and away from one another, and power multiplying means for operating the toggle mechanism to close the jaws, said last named means including an actuating handle operable by oscillatory movement to close the jaws, and by either oscillatory or rectilinear movement to open the jaws.

3. A sealing tool for producing a seal-joint between overlapped ends of a strapping band comprising a pair of jaws for effecting deformation of the band to produce the seal-joint, a reciprocable actuating handle, and means operable by movement of the handle in one direction cumulatively to cause relative movements of the jaws in one direction and by rectilinear movement in the other direction to open the jaws.

4. A sealing tool for producing a seal-joint between overlapped ends of a strapping band comprising a pair of jaws for effecting deformation of the band to produce the seal-joint, a reciprocable actuating handle, means operable by movement of the handle in one direction cumulatively to cause relative movements of the jaws in one direction and by rectilinear movement to cause movement of the jaws in the other direction, and means for preventing reverse movements of the jaws when movements of the handle are reversed.

5. A sealing tool for producing a seal-joint between overlapped ends of a strapping band comprising a pair of pivoted jaws for effecting deformation of the band to produce the seal-joint, an actuating handle, power translating mechanism for translating movements of the handle into pivotal movements of the jaws and an adjustable ratchet for causing reciprocation of the handle cumulatively to produce movements of the jaws interchangeably either to open them or to close them.

6. A sealing tool for producing a seal-joint between overlapped ends of a strapping band comprising a head, a pair of movable jaws carried by the head for effecting deformation of the band to produce the seal-joint, a reciprocable slide mounted on the head, power multiplying means interconnecting the slide and the jaws to open and close the jaws upon reciprocation of the slide, an actuating handle and power translating mechanism for causing reciprocation of the handle cumulatively to produce movement of the slide in either direction interchangeably either to open or close the jaws.

7. A strapping band sealing tool comprising a pair of movable jaws, an actuating handle, power multiplying means interconnecting the handle and the jaws, including a pinion, and a ratchet carried by the handle and adjustable to two positions, in one position causing operation of the handle to close the jaws and in the other position causing the operation of the handle to open the jaws.

8. A sealing tool for producing a seal-joint between the overlapped ends of a strapping band, comprising a pair of movable jaws for deforming the overlapped strap ends, toggle mechanism for moving the jaws toward and away from one another, and power multiplying means for operating the toggle mechanism to close the jaws, said last named means including an actuating handle operable by oscillatory movement to close the jaws and by rectilinear movement to open the jaws.

9. A sealing tool for producing a seal-joint between overlapped ends of a strapping band comprising a pair of jaws for effecting deformation of the band to produce the seal-joint, a slide having a toggle connection with the jaws, a reciprocable actuating handle and a rack and pinion connection between the handle and the slide for actuating the latter to operate the jaws, a pawl on said handle engageable with said pinion, and means cooperating with said pawl and selectively operable to cause movement of the handle to produce cumulative rotation of the pinion in either direction.

10. A sealing tool for producing a seal-joint between overlapped ends of a strapping band comprising a pair of jaws for effecting deformation of the band to produce the seal-joint, a slide having a toggle connection with the jaws, a reciprocable actuating handle, a rack held stationary, a pinion to which the handle is pivoted and engaging the rack, and a pawl carried by the handle and engageable with the pinion for rotating the latter in reverse directions.

11. A sealing tool of the character described including a head, a stationary handle attached to the head, a slide carried by the head, jaws carried by the head, at least one of said jaws being pivoted and having linkage connection with the slide, a handle pivoted to the slide and operative connections between the handle and the head including a rack and pinion to cause movement of the slide upon actuation of the handle, a pawl on said handle engageable with said pinion and means cooperating with said pawl and selectively operable to cause movement of the handle to produce cumulative rotation of the pinion in either direction.

12. A sealing tool for producing a union between the overlapped ends of a strapping band comprising a pair of relatively movable jaws for joining the overlapped strap ends, a slide having a toggle connection with the jaws, a reciprocable actuating handle, a stationary rack, a pinion to which the handle is pivoted and engaging the rack, a pawl carried by said handle and engageable with said pinion and means cooperating with said pawl and selectively operable to cause movement of the handle to produce cumulative rotation of the pinion in either direction.

13. A sealing tool for producing a union between the overlapped ends of a strapping band comprising a pair of relatively movable jaws for joining the overlapped strap ends, toggle mechanism for effecting relative movement of the jaws toward and away from each other, power multiplying means for operating the toggle mechanism to close the jaws, said last named means including an actuating handle operable by oscillatory movement to close the jaws and by either oscillatory or rectilinear movement to open the jaws.

In witness whereof, I hereunto subscribe my name this 18th day of June, 1928.

MILTON C. TAYLOR.